US010869166B2

United States Patent
Tyagi et al.

(10) Patent No.: US 10,869,166 B2
(45) Date of Patent: *Dec. 15, 2020

(54) LOCATION CORRELATION IN A REGION BASED ON SIGNAL STRENGTH INDICATIONS

(71) Applicant: Motorola Mobility LLC, Chicago, IL (US)

(72) Inventors: Vivek Kumar Tyagi, Chicago, IL (US); Douglas Alfred Lautner, Round Lake, IL (US); Nikhil Ambha Madhusudhana, Chicago, IL (US); Sudhir C. Vissa, Bensenville, IL (US); Miao Song, Naperville, IL (US); Yunming Wang, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/588,512

(22) Filed: Sep. 30, 2019

(65) Prior Publication Data

US 2020/0037113 A1 Jan. 30, 2020

Related U.S. Application Data

(60) Continuation of application No. 16/282,158, filed on Feb. 21, 2019, which is a division of application No. 16/049,342, filed on Jul. 30, 2018.

(51) Int. Cl.
*H04W 4/029* (2018.01)
*H04W 64/00* (2009.01)
(Continued)

(52) U.S. Cl.
CPC .......... *H04W 4/029* (2018.02); *H04B 17/318* (2015.01); *H04W 24/08* (2013.01); *H04W 64/003* (2013.01); *H04W 4/80* (2018.02)

(58) Field of Classification Search
CPC ....... H04W 4/029; H04W 4/80; H04B 17/318
(Continued)

(56) References Cited

U.S. PATENT DOCUMENTS 10,484,832 B1 11/2019 Tyagi et al.
10,499,194 B1 12/2019 Tyagi et al.
(Continued)

OTHER PUBLICATIONS

"Non-Final Office Action", U.S. Appl. No. 16/049,342, dated Mar. 22, 2019, 14 pages.
(Continued)

*Primary Examiner* — Nghi H Ly
(74) *Attorney, Agent, or Firm* — SBMC

(57) ABSTRACT

In aspects of location correlation in a region, a mobile device implements a location module that determines a current location of the mobile device in a region within communication range of a radio system based on location data received in radio signals from the radio system. The location module determines region coordinates at the current location of the mobile device in the region. The location module can then associate the region coordinates at the current location of the mobile device in the region with pixel grid coordinates determined from a digital image view as captured by a camera system in the region, and generate a location mapping of the region based on the current location and subsequent locations of the mobile device in the region. The location mapping correlates the locations of the mobile device in the region based on the pixel grid coordinates at the respective locations.

20 Claims, 8 Drawing Sheets

(51) Int. Cl.
    *H04B 17/318*    (2015.01)
    *H04W 24/08*    (2009.01)
    *H04W 4/80*    (2018.01)

(58) Field of Classification Search
    USPC ............... 455/422.1, 456.1, 418, 404.2, 421
    See application file for complete search history.

(56) References Cited

U.S. PATENT DOCUMENTS

| | | | |
|---|---|---|---|
| 2010/0135178 A1 | 6/2010 | Aggarwal et al. | |
| 2011/0260922 A1 | 10/2011 | Zhang et al. | |
| 2012/0164982 A1* | 6/2012 | Klein | G07C 13/00 455/411 |
| 2014/0148195 A1 | 5/2014 | Bassan-Eskenazi et al. | |
| 2015/0105099 A1 | 4/2015 | Luo et al. | |
| 2016/0069978 A1 | 3/2016 | Rangarajan et al. | |
| 2016/0205238 A1* | 7/2016 | Abramson | G01C 21/3641 455/456.4 |
| 2016/0381553 A1* | 12/2016 | Lee | H04W 12/06 455/411 |
| 2019/0051003 A1 | 2/2019 | Burgett | |
| 2020/0037112 A1 | 1/2020 | Tyagi et al. | |

OTHER PUBLICATIONS

"Non-Final Office Action", U.S. Appl. No. 16/282,158, dated Mar. 19, 2019, 14 pages.
"Notice of Allowance", U.S. Appl. No. 16/049,342, dated Jul. 16, 2019, 7 pages.
"Notice of Allowance", U.S. Appl. No. 16/282,158, dated Aug. 12, 2019, 7 pages.
"Restriction Requirement", U.S. Appl. No. 16/049,342, dated Jan. 10, 2019, 6 pages.
Ferreira,"Localization and Positioning Systems for Emergency Responders: a Survey", May 2017, 37 pages.
He,"Wi-Fi Fingerprint-Based Indoor Positioning: Recent Advances and Comparisons", Aug. 2015, pp. 466-490.
Klann,"LifeNet: an Ad-hoc Sensor Network and Wearable System to Provide Firefighters with Navigation Support", Aug. 1, 2018, pp. 124-127.
Kulaib,"An Overview of Localization Techniques for Wireless Sensor Networks", Apr. 2011, pp. 167-172.
Zhang,"Localization Technologies for Indoor Human Tracking", Jun. 2010, 6 pages.
"Supplemental Notice of Allowability", U.S. Appl. No. 16/049,342, dated Oct. 24, 2019, 2 pages.
"Supplemental Notice of Allowability", U.S. Appl. No. 16/282,158, dated Oct. 24, 2019, 2 pages.
"Non-Final Office Action", U.S. Appl. No. 16/588,413, dated Nov. 4, 2019, 7 pages.
"Notice of Allowance", U.S. Appl. No. 16/588,413, dated Aug. 17, 2020, 9 pages.

* cited by examiner

LOCATION CORRELATION IN A REGION BASED ON SIGNAL STRENGTH INDICATIONS

RELATED APPLICATIONS

This application is a continuation of and claims priority to U.S. patent application Ser. No. 16/282,158 filed Feb. 21, 2019 entitled "Location Correlation in a Region based on Signal Strength Indications," the disclosure of which is incorporated by reference herein in its entirety. U.S. patent application Ser. No. 16/282,158 is a divisional of and claims priority to U.S. patent application Ser. No. 16/049,342 filed Jul. 30, 2018 entitled "Location Correlation in a Region based on Signal Strength Indications," the disclosure of which is incorporated by reference herein in its entirety.

BACKGROUND

An indoor location system, or real-time location system, enables a location of a mobile device in a region to be determined, and the mobile device can be tracked as the device moves throughout the region. The indoor location system provides location data, such as in a coordinate system (e.g., x, y, and z coordinate system) or as an association with a known area (e.g., within a vicinity of a shop), to determine the location of the device in the region. However, an indoor location system, or real-time location system, requires a labor-intensive installation process, and can require a substantial amount of time and cost to set up.

Implementation of an indoor location system typically includes a site survey or training phase to measure and mark physical locations within the region, and to associate the locations in the region with received signal strength indication (RSSI) values of reference signals at each of the physical locations in the region. However, the measuring and marking of the physical locations, and determining the RSSI values of the reference signals are typically separate steps performed manually. This leads to a time consuming operation to complete the training phase during setup and implementation of an indoor location system. Conventional techniques used for implementing an indoor location system typically require a time and labor intensive setup process that results in high setup costs. Further, the quality of data points used to measure and mark the physical locations in a region are not always accurate, and can be error prone, which leads to inaccurate location data for the indoor location system.

BRIEF DESCRIPTION OF THE DRAWINGS

Implementations of location correlation in a region based on signal strength indications are described with reference to the following Figures. The same numbers may be used throughout to reference like features and components shown in the Figures.

DETAILED DESCRIPTION

Figure 1:
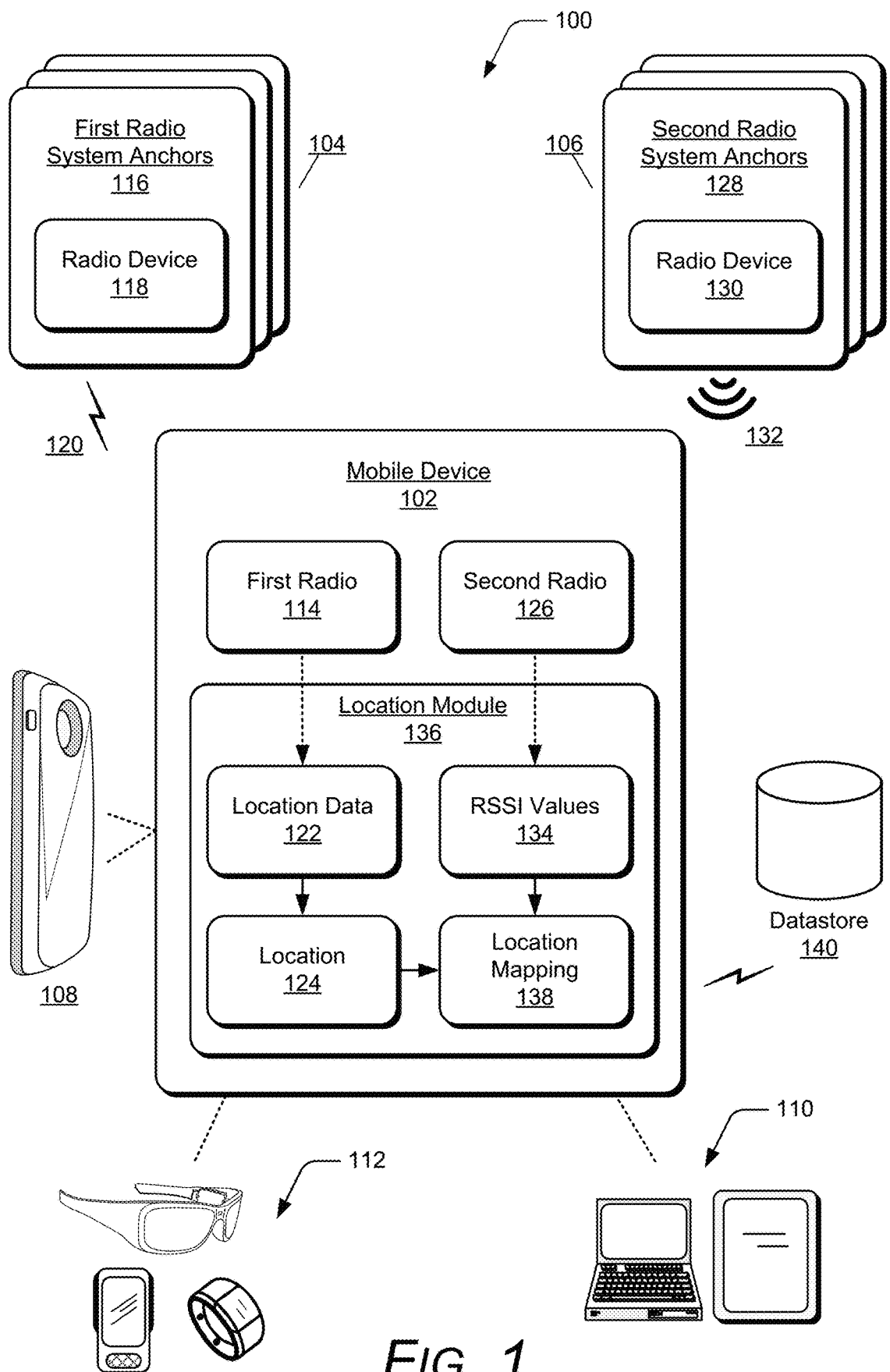
FIG. 1 illustrates an example location system that can be used to implement techniques of location correlation in a region based on signal strength indications as described herein.

Implementations of location correlation in a region based on signal strength indications are described, and provide techniques for a location system to generate a location mapping of a region using different radio systems. The region can be mapped using signals from a first radio system to correlate locations of a mobile device with signals from a second radio system. The first radio system can be implemented as an ultra-wide band (UWB) radio system that provides location data to a mobile device in a region of the location system, and the second radio system can be implemented as a Bluetooth™ radio system that provides reference data or reference signals. The location mapping, also referred to as a fingerprint database or a location record database, correlates locations in the region with the reference data at respective locations in the region. The reference data can include received signal strength indication (RSSI) values of Bluetooth™ signals from the Bluetooth™ radio system.

In aspects of location correlation in a region based on signal strength indications, the UWB radio system includes multiple UWB anchors that are temporarily positioned throughout an area to create a region for location mapping. A location system can include various sizes of locations in the region. For example, the location system can be installed within a building with each location in the region specified as a one meter by one meter (1 m×1 m) area. The multiple UWB anchors are positioned throughout the building to enable location detection of a UWB tag at a particular location in the region. The UWB tag communicates with the UWB anchors and based on the timing of signals communicated between the UWB tag and the UWB anchors, the location of the UWB tag can be determined with an accuracy of thirty centimeters or less (<30 cm). The precise location detection of the UWB system can be utilized to define a grid size of the locations in the region. Following the example above, a region having dimensions of five meters by five meters (5 m×5 m) and a grid size of one meter by one meter (1 m×1 m), results in the region having twenty-five locations in the region.

The Bluetooth™ radio system of the location system includes multiple Bluetooth™ anchors that are permanently positioned in the region to provide reference data. For example, the Bluetooth™ anchors can transmit signals, also referred to as beacon messages, and RSSI values of the beacon messages are utilized as the reference data that is associated or correlated with each respective location in the region.

In aspects of location correlation in a region based on signal strength indications, a mobile device includes a UWB radio that communicates with the UWB anchors of a UWB system. The UWB radio of the mobile device acts as a UWB tag discussed above to enable location determination or tracking of the mobile device in the region. The mobile device also includes a Bluetooth™ radio that receives the beacon messages from the Bluetooth™ anchors of the location system to correlate with the respective locations in the region. Alternatively or in addition, a camera device or system of cameras may be utilized over the region in which the mobile device is located, and the location of the mobile device in the region can be correlated with a pixel grid, such as in a digital image view of the region on a viewscreen. The UWB radio communications can be utilized to map the actual location of the mobile device in the region to the pixel grid location. After the region is mapped and the UWB radio system is removed from the location system, the camera can be utilized to track the mobile device in the region, and the pixel grid coordinates are translated to the region coordinates, which may then be communicated to the mobile device.

The mobile device implements a location module that can receive location data from the UWB radio system via the UWB radio of the mobile device, and determine a location of the mobile device based on the location data from the UWB radio system. The location module of the mobile device can also receive the location data from the camera device as the pixel grid coordinates are mapped to the region coordinates. The location module can also receive the beacon messages from the Bluetooth™ anchors of the Bluetooth™ radio system via the Bluetooth™ radio of the mobile device. The beacon messages can be utilized by the location module to determine RSSI values from each of the beacon messages received at the location, and associate the determined RSSI values of the beacon messages with the location of mobile device. The location module can then generate a location mapping or fingerprint database that correlates the location with the determined RSSI values of the beacon messages received at the location.

In aspects of location correlation in a region based on signal strength indications, the UWB and Bluetooth™ radio systems are utilized during a setup process, also known as a training phase or ground-truth measurements, of the location system to generate the location mapping of the region. When the location mapping of the region has been completely generated, the UWB radio system can be removed from the location system. The Bluetooth™ radio system remains in place after the UWB radio system is removed to enable location detection or location tracking of devices in the region. The location detection of devices in the region can be determined based on RSSI values of beacon messages received from the Bluetooth™ radio system at a particular location of a device, and using the RSSI values of the beacon messages to reverse search the location mapping to extract the particular location.

The use of the UWB radio of the mobile device and the UWB system to determine accurate and precise locations in the region, and the use of the Bluetooth™ radio of the mobile device and the Bluetooth™ radio system to determine RSSI values of beacon messages transmitted from the Bluetooth™ anchors enables the mobile device to simultaneously or near simultaneously generate the location mapping for the region. The described techniques of determining locations in the region and associating the respective locations with RSSI values of the beacon messages provides a faster and optimized manner effective to overcome the problems faced by the labor intensive setup process that results in high costs to implement a location system. It should also be noted that although features and aspects of location correlation in a region based on signal strength indications are described and illustrated in the context of a UWB radio system and a Bluetooth™ radio system, the described features and aspects can be implemented with various different radio-based systems, such as with Bluetooth™ Low Energy (BLE), Wi-Fi, RFID, NFC, and the like.

While features and concepts of location correlation in a region based on signal strength indications can be implemented in any number of different devices, systems, environments, and/or configurations, implementations of location correlation in a region based on signal strength indications are described in the context of the following example devices, systems, and methods.

FIG. 1 illustrates an example location system 100 that can be used to implement techniques of location correlation in a region based on signal strength indications as described herein. In this example, the location system 100 includes a mobile device 102, a first radio system 104, and a second radio system 106. The mobile device 102 may be any type of device, such as mobile phone 108 or portable computing devices 110. Examples of portable computing devices 110 depicted in FIG. 1 include a laptop or tablet device. The portable computing devices 110 may also be configured as a wearable device 112 that is designed to be worn by, attached to, carried by, or otherwise transported by a user. Examples of the wearable devices 112 include glasses, a smart band or watch, and a pod device, such as clip-on fitness device, media player, or tracker. Other examples of wearable devices 112 include but are not limited to badges, a key fob, an access card, and a ring, an article of clothing, a glove, or a bracelet, to name a few examples. Generally, the mobile device 102 is an electronic and/or computing device implemented with various components, such as a processing system and memory, as well as any number and combination of different components as further described with reference to the example device shown in FIG. 7.

The mobile device 102 includes a first radio 114 implemented to communicate with first radio system anchors 116 of the first radio system 104. Each of the radio system anchors 116 include a radio device 118 to facilitate communication between the mobile device 102 and the first radio system anchors 116. The first radio system anchors 116 form the first radio system 104, and can be utilized to transmit a first set of radio signals 120 that includes location data 122 corresponding to locations in a region, such as for a location tracking system. The location data 122 can include an indication of a current location 124 of the mobile device 102 in the region. Alternatively or in addition, the location data 122 may include other data, such as the timing of signals communicated between the first radio 114 of the mobile device 102 and the first radio system anchors 116, to enable the mobile device 102 to determine the current location 124 of the mobile device 102 in the region based on the timing of the signals. Generally, the region may be an indoor region within a building, multiple indoor regions within the building, an outdoor region, or any predetermined area setup with a location tracking system, as further described below with reference to the example environment shown in FIG. 3.

The mobile device 102 includes a second radio 126 implemented to receive signals from second radio system anchors 128 of the second radio system 106. Each of the radio system anchors 128 include a radio device 130 to facilitate wireless communication between the mobile device 102 and the second radio system anchors 128. The second radio system anchors 128 form the second radio system 106, and the radio system anchors 128 are positioned throughout the region. The second radio system anchors 128 transmit a second set of radio signals 132 to enable the mobile device 102, when within communication range of any of the second radio system anchors 128, to determine reference data and associate or correlate with the locations in the region. The reference data can include received signal strength indication (RSSI) values 134 determined from the second set of radio signals 132 at the current location 124 of the mobile device.

The mobile device 102 includes a location module 136 that implements features of location correlation in a region based on signal strength indications. The location module 136 is implemented to determine the current location 124 of the mobile device based on the location data 122 received in the first set of radio signals 120 at the current location 124 of the mobile device. The location module 136 can then associate the current location 124 of the mobile device in the region with the RSSI value 134 determined from each of the radio signals received in the second set of radio signals 132 received from the second radio system 106. A location mapping 138 of the region can then be generated by the location module 136 based on the current location 124 and subsequent locations of the mobile device in the region. The location mapping 138 includes the locations of the mobile device 102 in the region correlated with the determined RSSI values 134 at the respective locations.

In aspects of location correlation in a region based on signal strength indications, the location module 136 simultaneously or near simultaneously performs location determinations of the mobile device 102 based on the first set of radio signals 120 and RSSI value determinations for each of the signals in the second set of radio signals 132. For example, when a current location 124 of the mobile device 102 has been determined, RSSI values 134 at the current location 124 can be determined from each of the radio signals received from the second radio system anchors 128, and the RSSI values 134 can be determined at the same time or within a threshold period of time after the current location 124 is determined.

When the location mapping 138 has been generated to correlate the locations 124 in the region with the RSSI values 134 of the radio signals from the second radio system anchors 128 at the respective locations, the location module 136 stores the location mapping 138 on a datastore 140 via any suitable communication system, such as Wi-Fi, Bluetooth™, USB, Ethernet, and the like. Alternatively, the location module 136 may be implemented to store the location mapping 138 on the datastore 140 from the beginning of a setup process of the location system 100, and update the location mapping 138 stored in the datastore 140 when subsequent locations 124 have been determined and the RSSI values 134 of the radio signals from the second radio system anchors 128 have been associated or correlated with the subsequent locations.

Alternatively or in addition, a backend server or computing device may be included in the location system 100 that can be implemented to determine the current location of the mobile device 102 in the region based on the timing of signals communicated between the first radio 114 of the mobile device 102 and the first radio system anchors 116 of the first radio system 104. The backend server can transmit the current location of the mobile device 102 to the mobile device via any suitable communication method. For example, the mobile device 102 can include a Wi-Fi radio that communicates with the backend server, via a wireless local area network (WLAN) to receive the current location 124 of the mobile device. This enables location determinations based on location data received from the first radio 114 of the mobile device 102 and the first radio system anchors 116 to be performed on the backend server, rather than being performed by a processing system of the mobile device 102. The backend server may also be implemented to include the datastore 140 that stores and maintains the location mapping 138.

In aspects of location correlation in a region based on signal strength indications, the location mapping 138 can be completely generated and stored on the datastore 140, and the mobile device 102 or a different mobile device that includes the second radio 126 can then receive an indication of its location in the region without the first radio system 104 being a part of the location system 100. For example, the first radio system anchors 116 can be removed from the location system 100 after the location mapping 138 has been completely generated for the region. The different mobile device enters the region and determines RSSI values in the second set of radio signals 132 received at a particular location in which the different mobile device is currently located in the region. The different mobile device can also communicate the determined RSSI values in the second set of radio signals to the backend server that includes the datastore 140, which maintains the location mapping 138. In response, an indication of the different mobile device location in the region based on the determined RSSI values is received from the backend server.

Figure 2:
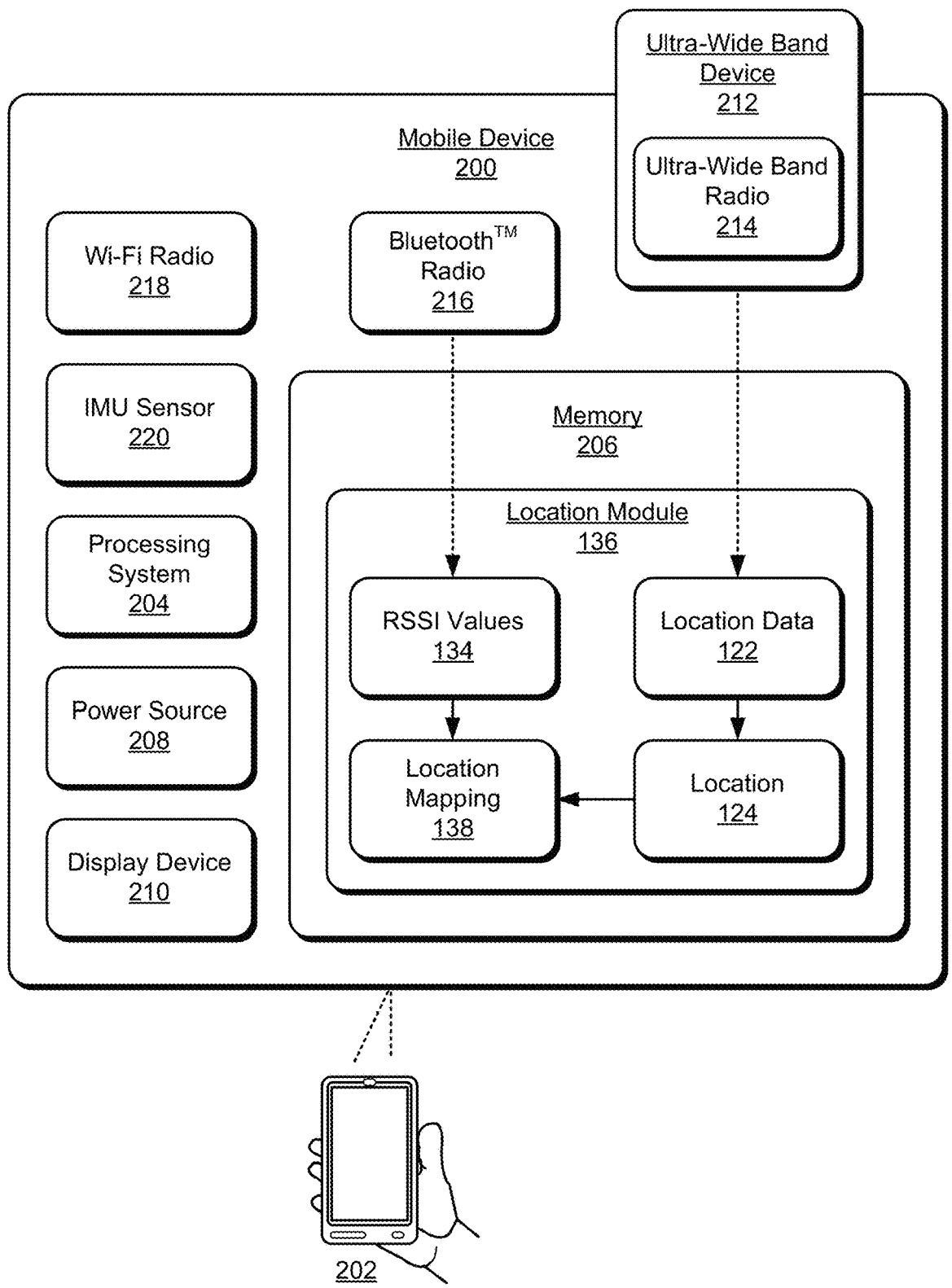
FIG. 2 illustrates an example mobile device for location correlation in a region based on signal strength indications to implement the techniques described herein.

FIG. 2 illustrates an example mobile device 200 in which aspects of location correlation in a region based on signal strength indications can be implemented. The example mobile device 200 includes any type of mobile device, such as a mobile phone 202. Generally, the mobile device 200 is any type of an electronic and/or computing device implemented with various components, such as a processing system 204 and memory 206, as well as any number and combination of different components as further described with reference to the example device shown in FIG. 7. For example, the mobile device 200 can include a power source 208 and a display device 210. In this example, the mobile device 200 may be implemented as the mobile device 102 that is shown and described with reference to FIG. 1.

The mobile device 200 includes the location module 136 that implements features of location correlation in a region based on signal strength indications, as shown and described with reference to FIG. 1. The location module 136 can be implemented as a software application or software module, such as computer-executable software instructions that are executable with a processor (e.g., with the processing system 204). As a software application, the location module 136 can be stored on computer-readable storage memory (e.g., the memory 206), or any suitable memory device or electronic data storage implemented with the mobile device. Alternatively, the location module 136 may be implemented in hardware, or as a combination of software and hardware components.

The mobile device 200 includes an ultra-wide band (UWB) device 212 with a UWB radio 214 to facilitate communication between the mobile device 200 and a real time location system (RTLS) using UWB anchors. The UWB device 212 may include independent processing, memory, and logic components as a computing and/or electronic device that operates with the mobile device 200 and/or as integrated components of the mobile device. In this example, the UWB device 212 is an attachment device that operates with the mobile device 200. The location module 136 is implemented to communicate with the UWB device 212 to enable determination of a location of the mobile device 200 in a region as described above with reference to the first radio 114 and the first radio system 104 of FIG. 1.

The mobile device 200 includes a Bluetooth™ radio 216 to facilitate communication between the mobile device 200 and Bluetooth™ anchors in the region to determine RSSI values of beacon messages transmitted by the Bluetooth™ anchors. The Bluetooth™ radio 216 may include independent processing, memory, and logic components as a computing and/or electronic device that operates with the mobile device 200 and/or as integrated components of the mobile device. The location module 136 is implemented to communicate with the Bluetooth™ radio 216 which enables determination of the RSSI values of the beacon messages as described above with reference to the second radio 126 and the second radio system 106 of FIG. 1.

The location module 136 can be implemented to correlate locations of the mobile device 200 in a region utilizing the UWB device 212 with RSSI values of the beacon messages at respective locations utilizing the Bluetooth™ radio 216. The location module 136 shown in FIG. 2 can include the location data 122, location 124, RSSI values 134, and location mapping 138 that is shown and described with reference to FIG. 1.

In implementations, the location module 136 determines a current location 124 of the mobile device 200 based on the location data 122 received in a first set of radio signals by the UWB device 212 at the current location 124 of the mobile device. In other implementations, the UWB device 212 can determine the current location and provide the location module 136 with the current location of the mobile device 200. The current location 124 of the mobile device can then be associated with the RSSI values 134 determined from each of the beacon messages received by the Bluetooth™ radio 216. The location mapping 138 of the region is generated by the location module 136 based on the current location 124 and subsequent locations of the mobile device in the region. The location mapping 138 includes the locations in the region that are correlated with the determined RSSI values 134 at the respective locations of the mobile device 200.

When the location mapping 138 has been generated for the current location 124 of the mobile device 200, the location module 136 can store the location mapping 138 at another device via Wi-Fi radio 218. For example, a backend server that includes the datastore 140 is connected to a network and accessible by the mobile device 200 via Wi-Fi radio 218 (e.g., WLAN) to store the location mapping 138 in the datastore 140. In implementations, the location module 136 may store the location mapping 138 after the entire region has been mapped. In other implementations, the location module 136 may initially store the location mapping 138 in the datastore 140 and update the location mapping 138 via the Wi-Fi radio 218 as the mobile device 200 is moved to different locations in the region to map the entire region.

The mobile device 200 also includes an inertial measurement unit (IMU) sensor 220 implemented to detect movement or motion of the mobile device. The IMU sensor 220 can include, by way of example and not limitation, an accelerometer, gyroscope, force sensor, and the like from which movement of the mobile device 200 can be detected or determined. For example, the location module 136 can be implemented to receive an indication from the IMU sensor 220 that the mobile device 200 has moved or is moving. In response, the location module 136 can initiate location determination using the UWB device 212 of the mobile device 200 to determine whether the mobile device has moved out of its current location and to a next location in the region. In response to a determination that the mobile device 200 has moved to the next location in the region, the location module 136 initiates location determination to determine the next location, as well as RSSI value determinations for each of the beacon messages received at the next location as described above. In this way, as the mobile device 200 moves throughout the region, the location mapping 138 is updated to include subsequent locations in the region and associated RSSI values determined at the respective locations. This enables a user of the mobile device 200 to simply walk the entire region and have the location mapping 138 be completely generated based on the walk throughout the entire region with the mobile device.

Figure 3:
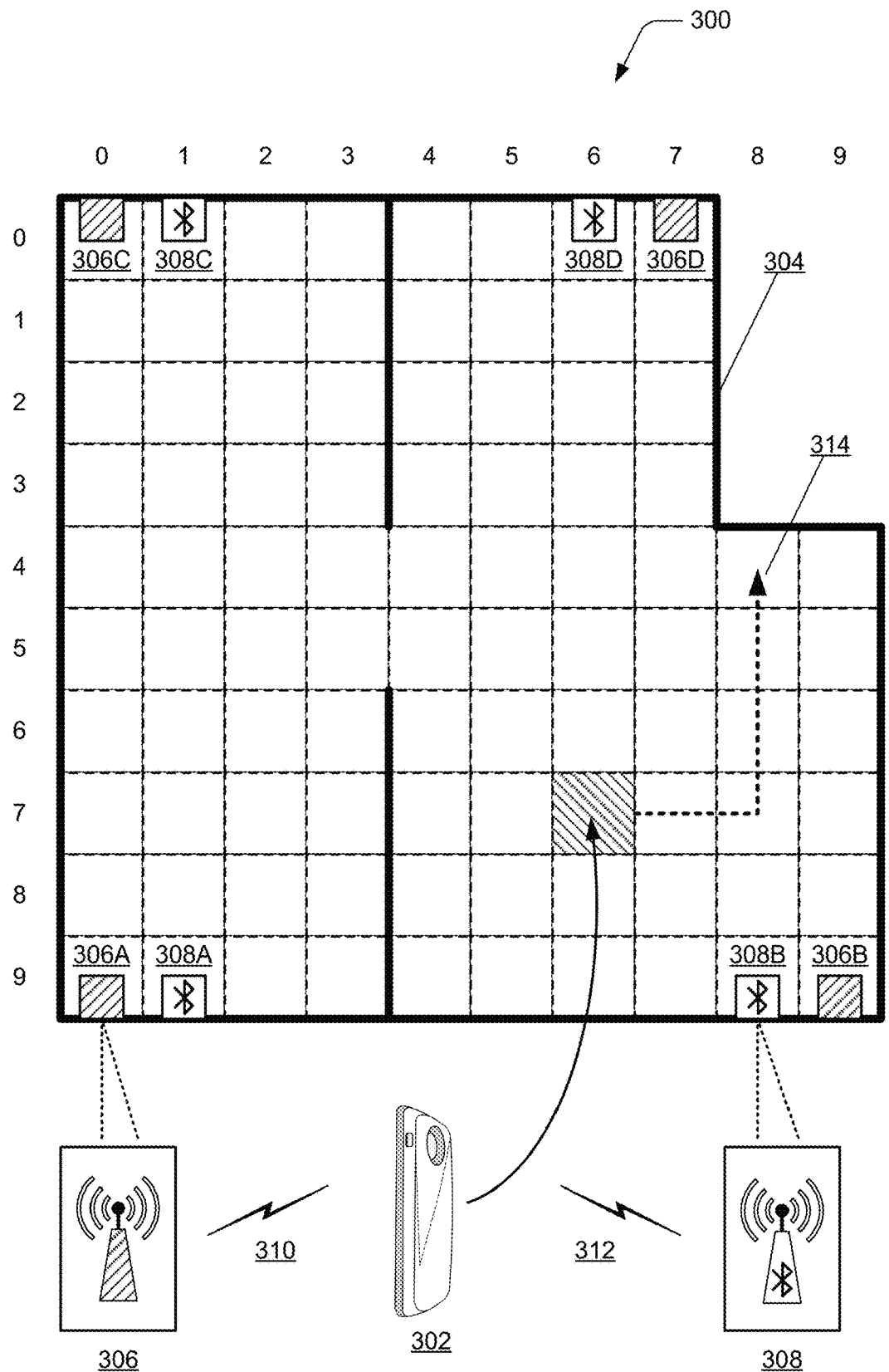
FIG. 3 illustrates an example environment for location correlation in a region based on signal strength indications to implement the techniques as described herein.

FIG. 3 illustrates an example environment 300 in which aspects of location correlation in a region based on signal strength indications can be implemented. The example environment 300 may include the example location system 100 implemented using UWB anchors to form the first radio system 104 and Bluetooth™ anchors to form the second radio system 106, as shown and described with reference to FIG. 1. An example mobile device 302 in the environment 300 includes any type of a mobile device, such as the mobile phone 202 that includes the location module 136, the IMU sensor 220, a UWB device 212, and a Bluetooth™ radio 216. Generally, the mobile device 302 is any type of an electronic and/or computing device implemented with various components, such as a processing system and memory, as well as any number and combination of different components as further described with reference to the example device shown in FIG. 7. The mobile device 302 may be implemented as the mobile device 102 that is shown and described with reference to FIG. 1, or as the mobile device 200 that is shown and described with reference to FIG. 2.

In this example, the environment 300 includes a region 304 of a location system that is represented as a grid array, and the mobile device 302 is located at a particular location in the region 304. The environment 300 includes UWB anchors 306A-D positioned throughout the region 304 as part of a real-time location system (RTLS) that operates in a similar manner as the first radio system 104 discussed above with reference to FIG. 1. The UWB anchors 306A-D transmit location signals 310 that includes location data 122 to enable the mobile device 302 within communication range of the UWB anchors 306 to determine a current location 124 of the mobile device 302 in the region 304.

The environment 300 also includes Bluetooth™ anchors 308A-D positioned throughout the region 304 as part of a Bluetooth™ radio system that operates in a similar manner as the second radio system 106 discussed above with reference to FIG. 1. Each of the Bluetooth™ anchors 308A-D transmit beacon messages 312 to enable the mobile device 302 within communication range of the Bluetooth™ anchors 308 to determine RSSI values in each of the beacon messages 312 received at the current location of the mobile device 302 in the region 304.

In this example, the region 304 includes ninety-two different grid positions or locations, and the mobile device 302 is currently located at grid position or location (6,7). The location module 136 of the mobile device 302 activates the UWB device 212 to receive the location signals 310 from the UWB anchors 306A-D. A current location of the mobile device 302 can then be determined by the location module 136 as location (6,7) in the region 304. The location module 136 also activates the Bluetooth™ radio 216 to receive the beacon messages 312 from the Bluetooth™ anchors 308A-D and determines RSSI values from the beacon messages 312 received at the location (6,7) in the region 304.

The location module 136 associates the location (6,7) in the region 304 with the determined RSSI values from the beacon messages 312 received at the location (6,7). The location module 136 can then generate the location mapping 138 that includes the location (6,7) and the RSSI values from the beacon messages 312 associated with the location (6,7). The location mapping 138 can then be stored in a datastore or database (e.g. datastore 140).

In this example, a user of the mobile device 302 moves the mobile device to location (8,4) by traversing a path 314 that moves through locations (7,7), (8,7), (8,6), and (8,5). The IMU sensor 220 of the mobile device 302 can detect that the mobile device is moving, and the location module 136 can determine whether the mobile device 302 has moved outside of the location (6,7) as described above. After a determination that the mobile device 102 has moved from the location (6,7), the location module 136 can then determine that the mobile device 302 has moved to location (7,7) in the region 304 and determines RSSI values from the beacon messages 312 received at the location (7,7) via the Bluetooth™ radio 216. The location module 136 then updates the location mapping 138 by including the location (7,7) and the RSSI values from the beacon messages 312 associated with the location (7,7).

As the user traverses the path 314, the location module 136 can simultaneously or near simultaneously perform location determination of the mobile device 302 and the associated RSSI value determinations from the beacon messages 312 at each of the locations along the path 314. In this way, the location mapping 138 can be quickly generated by simply having the user walk the entire region 304 with the mobile device 302 without any interruption at locations to manually mark a particular location from a RTLS and then measure associated RSSI values from beacon messages. This enables the location mapping 138 to be stored and updated in a faster and more efficient manner than traditional implementations of a location system.

Figure 4:
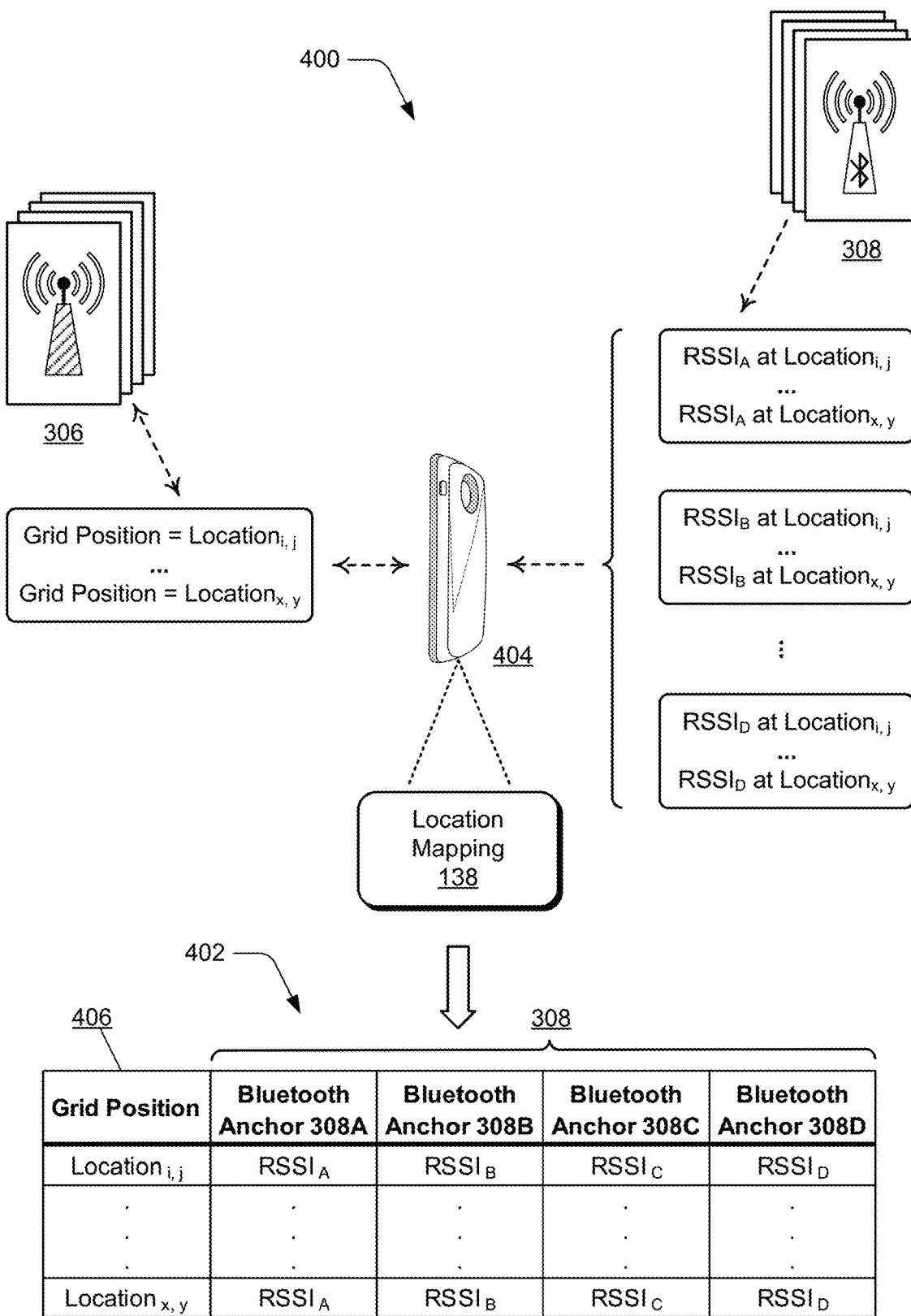
FIG. 4 illustrates an example environment and an example location mapping for location correlation in a region based on signal strength indications to implement the techniques as described herein.

FIG. 4 illustrates an example environment 400 and an example location mapping represented as table 402 in aspects of location correlation in a region based on signal strength indications. The example environment 400 may be implemented as the example environment 300 that is shown and described with reference to FIG. 3. The example mobile device 404 includes any type of a mobile device, such as the mobile phone 202 with the location module 136, IMU sensor 220, a UWB device 212, and a Bluetooth™ radio 216. Generally, the mobile device 404 is any type of an electronic and/or computing device implemented with various components, such as a processing system and memory, as well as any number and combination of different components as further described with reference to the example device shown in FIG. 7. The mobile device 404 may be implemented as the mobile device 102 that is shown and described with reference to FIG. 1, as the mobile device 200 that is shown and described with reference to FIG. 2, or the mobile device 302 that is shown and described with reference to FIG. 3.

As described above, the location mapping 138 can be generated by the location module 136 of the mobile device based on locations of the mobile device and determined RSSI values of beacon messages received at respective locations in the region. The location mapping 138 is shown in FIG. 4 as table 402 that includes information pertaining to grid positions 406 in the region 304 and RSSI values of beacon messages received from Bluetooth™ anchors 308 associated with respective locations in the region. The mobile device 404 includes the UWB device 212 to communicate with the UWB anchors 306 that transmit location signals 310 including location data to enable the mobile device 404 to determine a current location of the mobile device 404 in the region.

The locations in the region can be represented as a two-dimensional or three-dimensional coordinate system. In this example, the grid positions 406 in the table 402 are represented as two-dimensional coordinates. After the location module 136 of mobile device 404 has determined a current location, the location module can then store the current location in the location mapping 138. For example, referring to FIG. 3, the mobile device is initially located at location (6,7), and this location is stored in the location mapping 138 under the grid positions 406 column in the table 402 as "Location $_{6,7}$".

As shown in the table 402, each of the locations in the region listed under the grid position 406 column is associated with RSSI values from the Bluetooth™ anchors 308 in the region. Continuing the example described above, the location module 136 of mobile device 404 can determine RSSI values of beacon messages transmitted by the Bluetooth™ anchors 308 positioned throughout the region 304. The RSSI values of the beacon messages can then be stored in the location mapping 138 that corresponds to the location in which the RSSI values were determined and under the respective Bluetooth™ anchors columns in the table 402.

When the location module 136 of the mobile device 404 has completely mapped the region, the UWB anchors 306 can be removed from the region. For example, as the mobile device 404 moves to all of the ninety-two different locations in the region 304, the location module 136 simultaneously or near simultaneously performs location determination and RSSI value determinations as described above, and then stores each of the locations with the associated RSSI values from the beacon messages at respective locations in the location mapping 138. When all of the ninety-two different locations in the region 304 and associated RSSI values from the beacon messages have been stored in the location mapping 138, then the location mapping 138 has been completely generated for the region 304. The location mapping 138 can then be stored and maintained on datastore 140 or on a backend server that includes the datastore 140, which is connected to a network and accessible by the mobile device 404 and/or by different devices. The UWB anchors 306 can then be removed from the region 304 when the location mapping 138 has been completely generated.

The mobile device 404 or a different device can utilize the location mapping 138 to extract a location from the table 402 based on the RSSI values from the beacon messages received at the location. For example, with reference to FIG. 3, a different device may be at the location (5,5) in the region 304. The different device only receives beacon messages 312 from the Bluetooth™ anchors 308 after the UWB anchors 306 have been removed from the region 304. The different device can access the datastore 140 that maintains the location mapping 138 and the RSSI values determined at location (5,5) are reverse searched to extract a location from the location mapping 138. Alternatively, the different device transmits the RSSI values determined at location (5,5) to a backend server that includes the datastore 140 that maintains the location mapping 138. The backend server can be implemented to perform the reverse search of the location mapping 138 using the RSSI values received from the different device. The extracted location is then provided to the different device and indicates that the location of the different device in the region is at location (5,5).

Example methods 500, 600, and 700 are described with reference to respective FIGS. 5, 6, and 7 in accordance with implementations of location correlation in a region based on signal strength indications. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
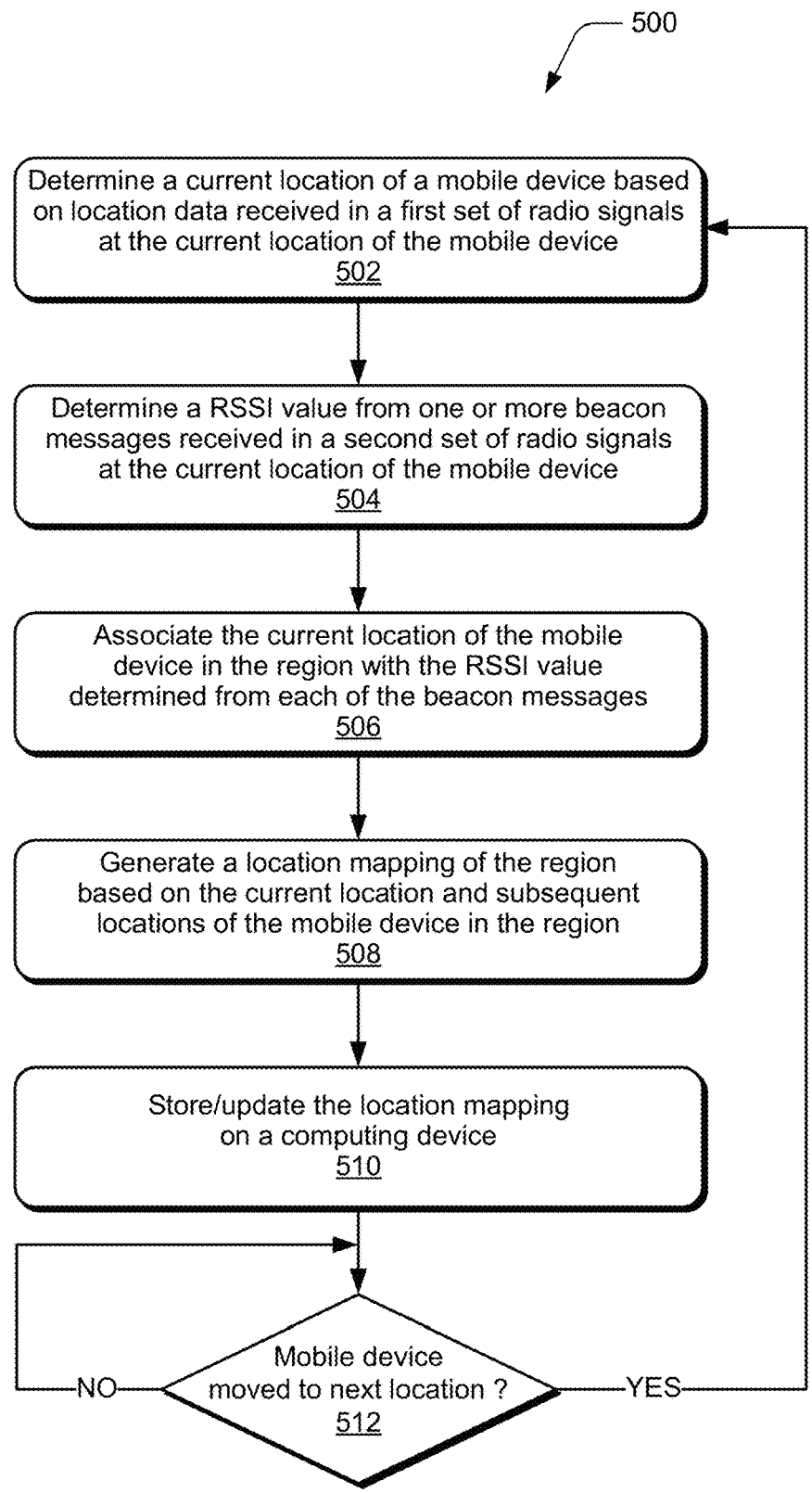
FIG. 5 illustrates an example method of location correlation in a region based on signal strength indications to implement the techniques as described herein.

FIG. 5 illustrates example method(s) 500 of location correlation in a region based on signal strength indications. The order in which the method is described is not intended to be construed as a limitation, and any number or combination of the described method operations can be performed in any order to perform a method, or an alternate method.

At 502, a current location of a mobile device is determined based on location data received in a first set of radio signals at the current location of the mobile device. For example, with reference to the example environment 300, the UWB anchors 306 transmits the location signals 310 that includes location data 122 that is received by the UWB device 212 of mobile device 302. The location module 136 then determines the current location 124 of the mobile device 302 in the region 304 based on the location data 122.

In an alternate example, the UWB device 212 acts as a UWB tag to enable location tracking of the mobile device 302 by a backend server. The current location of the mobile device can be determined by the backend server based on location data received from the UWB anchors 306 and the UWB device 212 of the mobile device 302. The backend server can then transmit the current location to the mobile device. For example, the current location can be transmitted by the backend server over a network that can be received by the mobile device 302 via the Wi-Fi radio 218 or any other suitable communication method.

At 504, a RSSI value is determined from one or more beacon messages received in a second set of radio signals at the current location of the mobile device. For example, the Bluetooth™ radio 216 of mobile device 302 receives beacon messages 312 from respective Bluetooth™ anchors 308A-D at the current location 124 of the mobile device 302 in the region 304. The location module 136 then determines RSSI values 134 from each of the beacon messages 312 received at the current location.

At 506, the current location of the mobile device in the region is associated with the RSSI value determined from each of the beacon messages. For example, the location module 136 of the mobile device 302 associates the current location 124 with the RSSI value 134 determined from each of the beacon messages 312 received at the current location.

At 508, a location mapping of the region is generated based on the current location and subsequent locations of the mobile device in the region. For example, the location module 136 of the mobile device 302 generates a location mapping 138 based on the determined RSSI values 134 from the beacon messages 312 associated with the current location 124 and subsequent locations of the mobile device in the region 304. The location mapping 138 correlates locations in the region 304 with the determined RSSI values 134 at the respective locations.

At 510, the location mapping is stored and/or updated on a computing device. For example, the location module 136 of the mobile device 302 stores the location mapping 138 on a computing device that includes datastore 140 that is accessible via the Wi-Fi radio 218 of the mobile device. In implementations, the location module 136 stores and updates the location mapping 138 on the computing device for every location the mobile device 302 moves through in the region 304. In other implementations, the location module 136 waits to store the location mapping 138 on the computing device until the location mapping 138 is completely generated for the region 304.

At 512, a determination is made as to whether the mobile device has moved to a next location. For example, the IMU sensor 220 generates sensor data indicating that the mobile device 302 has moved. The IMU sensor 220 can include an accelerometer that generates the sensor data indicating that the mobile device 302 has undergone acceleration, which corresponds to the mobile device 302 being moved. Alternatively or in addition, the IMU sensor 220 can include a gyroscope that generates the sensor data indicating that the mobile device 302 has undergone an angular displacement, which corresponds to the mobile device 302 being moved. The location module 136 of the mobile device 302 determines that the mobile device has moved to a next location in the region 304 based at least in part on sensor data received from the IMU sensor 220. The sensor data indicates that the mobile device has moved, but may not indicate that the mobile device has moved out of its current location and into a next location. If the sensor data indicates that the mobile device has moved, the location module 136 can then determine that the mobile device 302 is at the next location (e.g., the mobile device moved from location (6,7) to location (7,7) in FIG. 3) based on the location data 122 received from the UWB anchors 306.

If the mobile device has moved to the next location (i.e., "Yes" from 512), then the method 500 repeats the operations 502-510 for the next location determination of the mobile device in the region. If the mobile device has not moved to the next location (i.e., "No" from 512), then the location module 136 continues to monitor for a change of location of the mobile device at 512.

Figure 6:
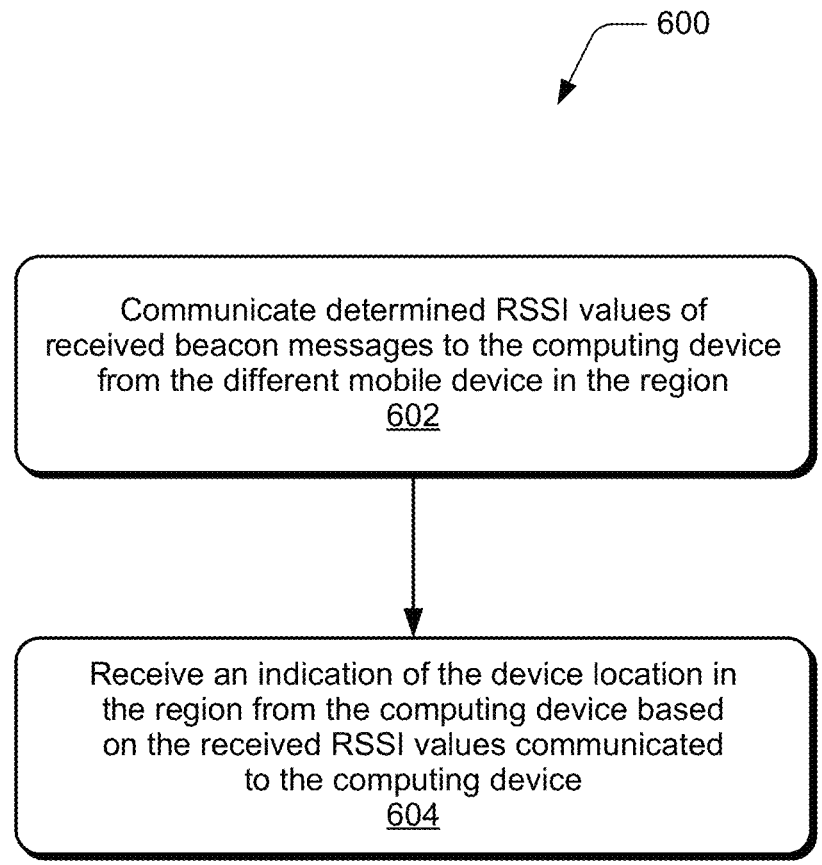
FIG. 6 illustrates an example method of location correlation in a region based on signal strength indications to implement the techniques as described herein.

FIG. 6 illustrates example method(s) 600 of location correlation in a region based on signal strength indications. The order in which the method is described is not intended to be construed as a limitation, and any number or combination of the described method operations can be performed in any order to perform a method, or an alternate method.

At 602, determined RSSI values of received beacon messages are communicated to a computing device from a different mobile device in the region. For example, with reference to FIG. 3, a different mobile device enters region 304 at location (6,9) and receives beacon messages 312 from Bluetooth™ anchors 308A-D. The different mobile device determines RSSI values from the received beacon messages at location (6,9) and communicates the determined RSSI values to the computing device that includes datastore 140 to maintain location mapping 138. The computing device reverse searches the location mapping 138 using the determined RSSI values from the different mobile device to extract a location of the different mobile device in the region 304.

At 604, an indication of the device location in the region is received from the computing device based on the determined RSSI values communicated to the computing device. For example, in response to the different mobile device communicating the determined RSSI values to the computing device, the different mobile device receives an indication of its location in the region from the computing device. As described above, the indication of the location of the different mobile device in the region 304 can be represented as two-dimensional or three-dimensional coordinates.

Figure 7:
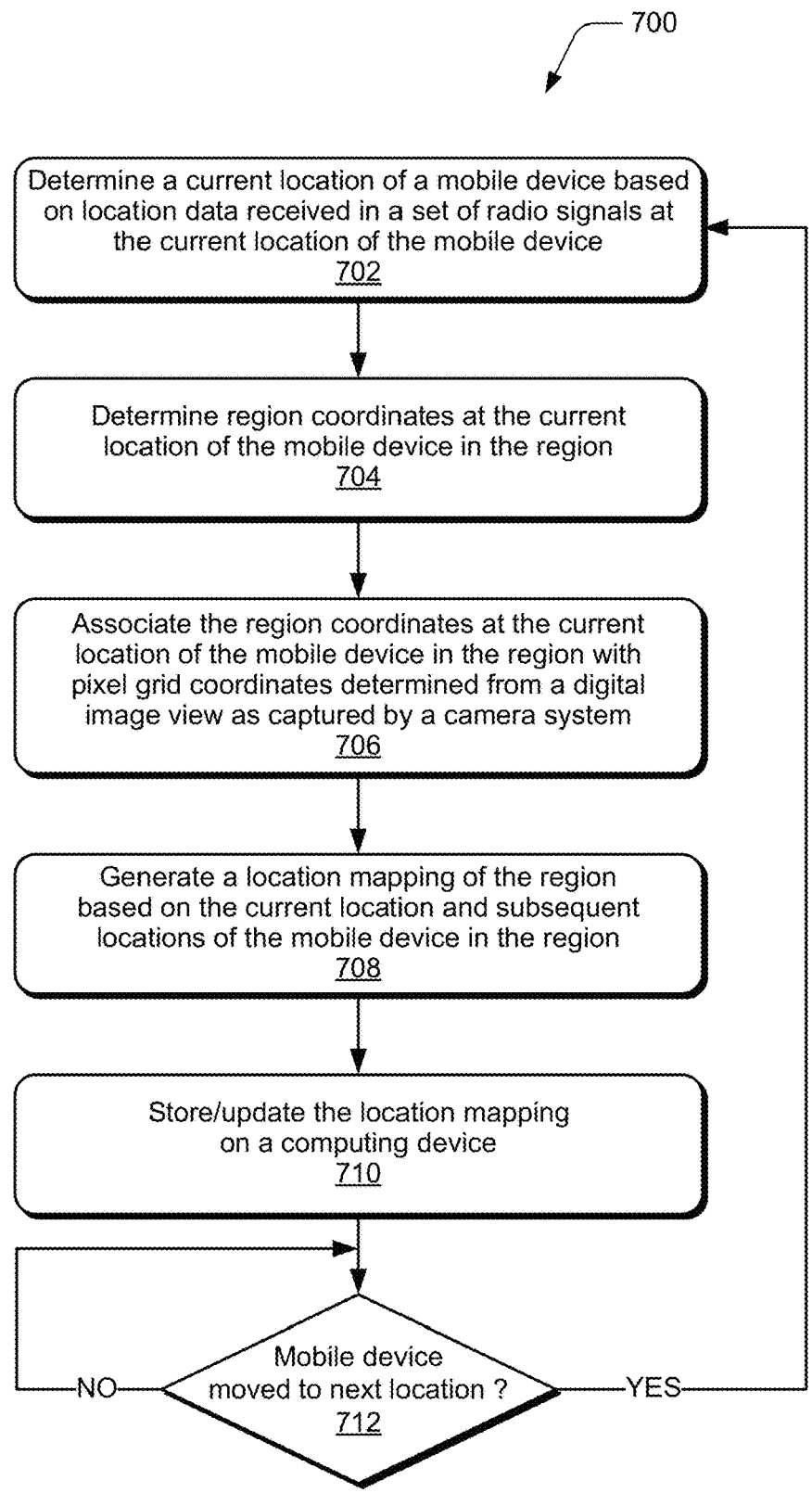
FIG. 7 illustrates an example method of location correlation in a region based on signal strength indications to implement the techniques as described herein.

FIG. 7 illustrates example method(s) 700 of location correlation in a region based on signal strength indications. The order in which the method is described is not intended to be construed as a limitation, and any number or combination of the described method operations can be performed in any order to perform a method, or an alternate method.

At 702, a current location of a mobile device is determined based on location data received in a set of radio signals at the current location of the mobile device. For example, with reference to the example environment 300, the UWB anchors 306 transmits the location signals 310 that includes location data 122 that is received by the UWB device 212 of mobile device 302. The location module 136 then determines the current location 124 of the mobile device 302 in the region 304 based on the location data 122.

In an alternate example, the UWB device 212 acts as a UWB tag to enable location tracking of the mobile device 302 by a backend server. The current location of the mobile device can be determined by the backend server based on location data received from the UWB anchors 306 and the UWB device 212 of the mobile device 302. The backend server can then transmit the current location to the mobile device. For example, the current location can be transmitted by the backend server over a network that can be received by the mobile device 302 via the Wi-Fi radio 218 or any other suitable communication method.

At 704, region coordinates are determined for the current location of the mobile device in the region, and at 706, the region coordinates at the current location of the mobile device in the region are associated with pixel grid coordinates determined from a digital image view as captured by a camera system. For example, the location module 136 of the mobile device 302 receives a digital image view of the region as captured by a camera system of the region. The location module 136 then determines the region coordinates at the current location 124 of the mobile device 302 in the region 304, and associates the region coordinates at the current location of the mobile device 302 with pixel grid coordinates determined from the digital image view as captured by the camera system.

At 708, a location mapping of the region is generated based on the current location and subsequent locations of the mobile device in the region. For example, the location module 136 of the mobile device 302 generates the location mapping 138 based on the current location 124 and subsequent locations of the mobile device in the region 304. The location mapping 138 correlates region coordinates at locations in the region 304 with the pixel grid coordinates determined from the digital image view of the region.

At 710, the location mapping is stored and/or updated on a computing device. For example, the location module 136 of the mobile device 302 stores the location mapping 138 on a computing device that includes datastore 140 that is accessible via the Wi-Fi radio 218 of the mobile device. In implementations, the location module 136 stores and updates the location mapping 138 on the computing device for every location the mobile device 302 moves through in the region 304. In other implementations, the location module 136 waits to store the location mapping 138 on the computing device until the location mapping 138 is completely generated for the region 304.

At 712, a determination is made as to whether the mobile device has moved to a next location. For example, the IMU sensor 220 generates sensor data indicating that the mobile device 302 has moved. The IMU sensor 220 can include an accelerometer that generates the sensor data indicating that the mobile device 302 has undergone acceleration, which corresponds to the mobile device 302 being moved. Alternatively or in addition, the IMU sensor 220 can include a gyroscope that generates the sensor data indicating that the mobile device 302 has undergone an angular displacement, which corresponds to the mobile device 302 being moved. The location module 136 of the mobile device 302 determines that the mobile device has moved to a next location in the region 304 based at least in part on sensor data received from the IMU sensor 220. The sensor data indicates that the mobile device has moved, but may not indicate that the mobile device has moved out of its current location and into a next location. If the sensor data indicates that the mobile device has moved, the location module 136 can then determine that the mobile device 302 is at the next location based on the location data 122 received from the UWB anchors 306.

If the mobile device has moved to the next location (i.e., "Yes" from 712), then the method 700 repeats the operations 702-710 for the next location determination of the mobile device in the region. If the mobile device has not moved to the next location (i.e., "No" from 712), then the location module 136 continues to monitor for a change of location of the mobile device at 712.

Figure 8:
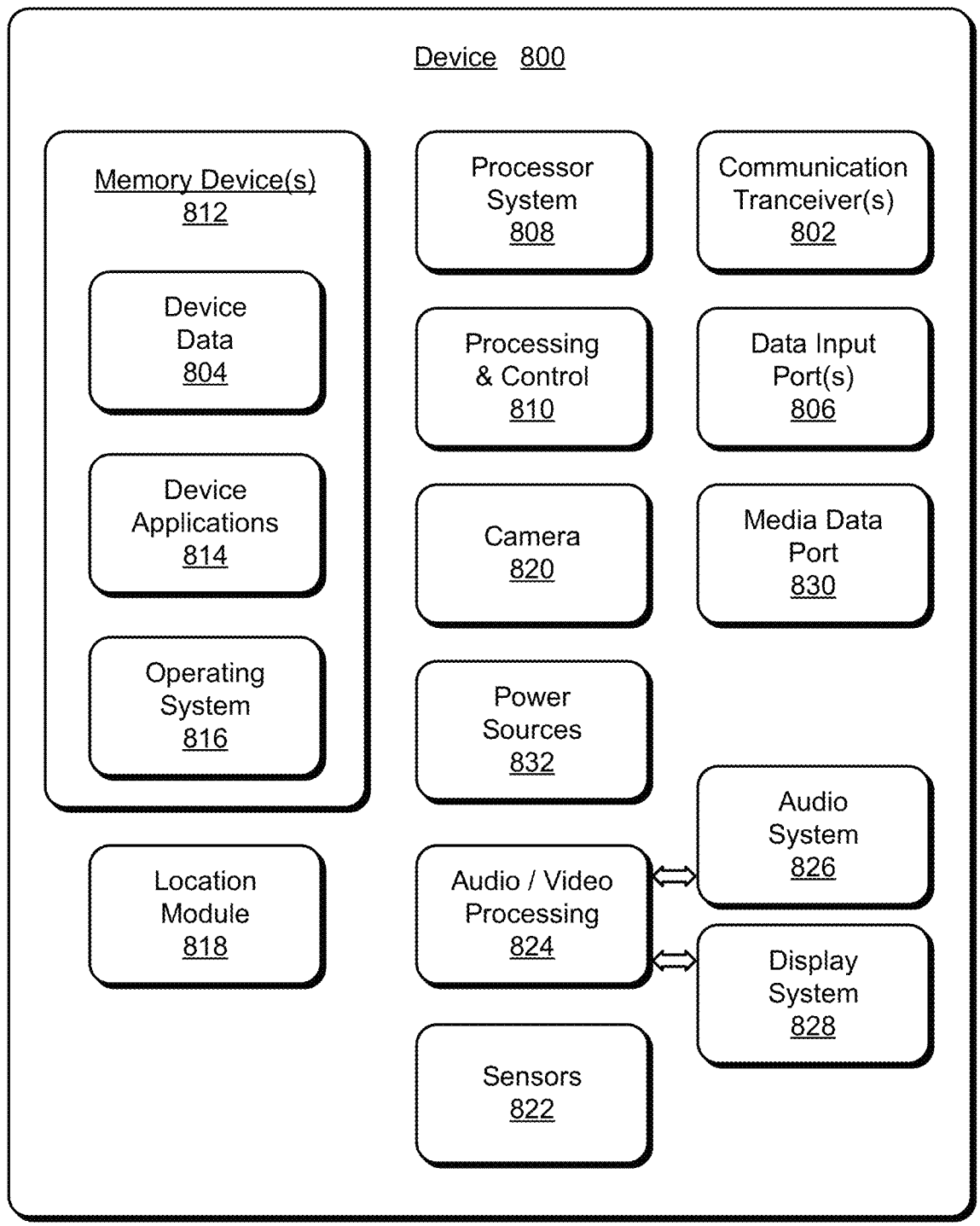
FIG. 8 illustrates various components of an example device that can implement aspects of location correlation in a region based on signal strength indications.

FIG. 8 illustrates various components of an example device 800, which can implement examples of location correlation in a region based on signal strength indications. The example device 800 can be implemented as any of the devices described with reference to the previous FIGS. 1-7, such as any type of mobile device, mobile phone, client device, wearable device, tablet, computing, communication, entertainment, gaming, media playback, and/or other type of electronic device. For example, the mobile device 102, the mobile device 200, the mobile device 302, and the mobile device 404 shown and described with reference to FIGS. 1-7 may be implemented as the example device 800. Further a wearable device may include any one or combination of a watch, armband, wristband, bracelet, glove or pair of gloves, glasses, jewelry items, clothing items, any type of footwear or headwear, and/or other types of wearables.

The device 800 includes communication transceivers 802 that enable wired and/or wireless communication of device data 804 with other devices. The device data 804 can include any of the location data, RSSI values, location mapping, and/or sensor data. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, algorithms, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory devices in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on.

In this example, the device 800 includes a location module 818 that implements features and aspects of location correlation in a region based on signal strength indications, and may be implemented with hardware components and/or in software as one of the device applications 814, such as when the device 800 is implemented as the mobile device 102, the mobile device 200, the mobile device 302, or the mobile device 404 described with reference to FIGS. 1-4. An example of the location module 818 is the location module 136 implemented as a software application and/or as hardware components in the mobile device 102 as described and shown in the previous figures. In implementations, the location module 818 may include independent processing, memory, and logic components as a computing and/or electronic device integrated with the example device 800.

In this example, the device 800 also includes a camera 820 and sensors 822, such as may be implemented in an inertial measurement unit (IMU). The sensors 822 can be implemented with various sensors, such as a gyroscope, an accelerometer, and/or other types of sensors to sense motion of the device. The various sensors 822 may also be implemented as components of an inertial measurement unit in the device. An example of the sensors 822 is the IMU sensor 220 of the mobile device 200.

The device 800 also includes an audio and/or video processing system 824 that generates audio data for an audio system 826 and/or generates display data for a display system 828. An example of the display system 828 is the display device 210 of the mobile device 200. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 830. In implementations, the audio system and/or the display system are integrated components of the example device. Alternatively, the audio system and/or the display system are external, peripheral components to the example device.

The device 800 can also include one or more power sources 832, such as when the device is implemented as a mobile device or portable device. The power sources may include a charging and/or power system, and can be implemented as a flexible strip battery, a rechargeable battery, a charged super-capacitor, and/or any other type of active or passive power source. An example of the power sources 832 is the power source 208 of the mobile device 200.

Although implementations of location correlation in a region based on signal strength indications have been described in language specific to features and/or methods, the subject of the appended claims is not necessarily limited to the specific features or methods described. Rather, the specific features and methods are disclosed as example implementations of location correlation in a region based on signal strength indications, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: determining a current location of a mobile device based on location data received in a first set of radio signals at the current location of the mobile device, the first set of radio signals received from one or more ultra-wide band radios that transmit the location data to the mobile device in a region that is within communication range of the one or more ultra-wide band radios; determining a received signal strength indication (RSSI) value from one or more beacon messages received in a second set of radio signals at the current location of the mobile device, the second set of radio signals received from one or more beacon messaging radios that transmit the beacon messages to the mobile device in the region; associating the current location of the mobile device in the region with the RSSI value determined from each of the beacon messages; and generating a location mapping of the region based on the current location and subsequent locations of the mobile device in the region, the location mapping configured to correlate locations of the mobile device in the region with the determined RSSI values at the respective locations.

Alternatively or in addition to the above described method, any one or combination of: storing the location mapping on a computing device communicatively accessible by a different mobile device that enters the region to access the location mapping and receive an indication of device location in the region. Communicating determined RSSI values of received beacon messages to the computing device from the different mobile device in the region; and receiving the indication of the device location in the region from the computing device based on the determined RSSI values communicated to the computing device. The received RSSI values of the received beacon messages are communicated to the computing device subsequent to the locations within the region being correlated with the determined RSSI values at the respective locations, the location mapping being stored on the computing device, and the one or more ultra-wide band radios being removed from the region. The one or more beacon messaging radios include one or more Bluetooth™ radios or one or more Wi-Fi radios that transmit the beacon messages from which the RSSI value from each of the beacon messages is determined. Determining that the mobile device has moved to a next location from the current location based on sensor data from inertial measurement sensors; determining the next location of the mobile device based on the location data received in the first set of radio signals at the next location of the mobile device; determining a next RSSI value from the beacon messages received in the second set of radio signals at the next location of the mobile device; associating the next location of the mobile device in the region with the next RSSI value determined from each of the beacon messages; and updating the location mapping of the region based on the next location of the mobile device in the region.

A mobile device, comprising: a first radio to receive a first set of radio signals from one or more ultra-wide band radios that transmit location data to the mobile device in a region that is within communication range of the one or more ultra-wide band radios; a second radio to receive a second set of radio signals from one or more beacon messaging radios that transmit beacon messages to the mobile device in the region; a processor system implements a location module to: determine a current location of the mobile device based on the location data received in the first set of radio signals at the current location of the mobile device; determine a received signal strength indication (RSSI) value from each of the beacon messages received in the second set of radio signals at the current location of the mobile device; associate the current location of the mobile device in the region with the RSSI value determined from each of the beacon messages; and generate a location mapping of the region based on the current location and subsequent locations of the mobile device in the region, the location mapping configured to correlate locations of the mobile device in the region with the determined RSSI values at the respective locations.

Alternatively or in addition to the above described mobile device, any one or combination of: the second radio system includes one or more Bluetooth™ radios or one or more Wi-Fi radios that transmit the beacon messages from which the RSSI value from each of the beacon messages is determined. The location module is implemented to store the location mapping on a computing device communicatively accessible by the mobile device that enters the region to access the location mapping and receive an indication of device location in the region. The location module is implemented to: communicate received RSSI values of received beacon messages to the computing device from the mobile device at a subsequent location in the region; and receive the indication of the device location of the mobile device in the region from the computing device based on the RSSI values communicated to the computing device. The received RSSI values of the received beacon messages are communicated to the computing device subsequent to the locations within the region being correlated with the determined RSSI values at the respective locations, the location mapping being stored on the computing device, and the first radio system being removed from the region. The location module is implemented to: determine that the mobile device has moved to a next location from the current location based on sensor data from inertial measurement sensors; determine the next location of the mobile device based on the location data received in the first set of radio signals at the next location of the mobile device; determine a next RSSI value from the beacon messages received in the second set of radio signals at the next location of the mobile device; associate the next location of the mobile device in the region with the next RSSI value determined from each of the beacon messages; and update the location mapping of the region based on the next location of the mobile device in the region.

A system, comprising: a first radio system to transmit a first set of radio signals that includes location data to enable a mobile device within communication range of the first radio system to determine a current location of the mobile device in a region; a second radio system to transmit a second set of radio signals to enable the mobile device in the region to determine received signal strength indication (RSSI) values in the second set of radio signals; the mobile device configured to: determine the current location of the mobile device based on the location data received in the first set of radio signals at the current location of the mobile device; determine a RSSI value from each of the radio signals in the second set of radio signals received at the current location of the mobile device; associate the current location of the mobile device in the region with the RSSI value determined from each of the radio signals in the second set of radio signals; and generate a location mapping of the region based on the current location and subsequent locations of the mobile device in the region, the location mapping configured to correlate locations of the mobile device in the region with the determined RSSI values at the respective locations.

Alternatively or in addition to the above described system, any one or combination of: the first radio system includes one or more ultra-wide band radios to transmit the first set of radio signals from which the current location of the mobile device in the region is determined. The second radio system includes one or more Bluetooth™ radios or one or more Wi-Fi radios to transmit the second set of radio signals from which the RSSI value from each of the radio signals in the second set of radio signals is determined. The mobile device is configured to store the location mapping on a computing device communicatively accessible by a different mobile device that enters the region to access the location mapping and receive an indication of a device location in the region. The different mobile device is configured to: communicate received RSSI values from received radio signals to the computing device; and receive the indication of the device location in the region from the computing device based on the received RSSI values communicated to the computing device. The mobile device is configured to: determine that the mobile device has moved to a next location from the current location based on sensor data from inertial measurement sensors; determine the next location of the mobile device based on the location data received in the first set of radio signals at the next location of the mobile device; determine a next RSSI value from each of the radio signals received in the second set of radio signals at the next location of the mobile device; associate the next location of the mobile device in the region with the next RSSI value determined from each of the radio signals in the second set of radio signals; and update the location mapping of the region based on the next location of the mobile device in the region. The first radio system is removed from the system subsequent to the locations within the region being correlated with the determined RSSI values at the respective locations. The locations in the region corresponds to a predetermined area of a particular size in the region.

A system, comprising: a radio system to transmit a set of radio signals that includes location data to enable a mobile device within communication range of the radio system to determine a current location of the mobile device in a region; a camera system to capture a digital image view of the region to correlate the mobile device with pixel grid coordinates in the region; the mobile device configured to: determine the current location of the mobile device based on the location data received in the set of radio signals at the current location of the mobile device; determine region coordinates at the current location of the mobile device in the region; associate the region coordinates at the current location of the mobile device in the region with the pixel grid coordinates determined from the digital image view as captured by the camera system; and generate a location mapping of the region based on the current location and subsequent locations of the mobile device in the region, the location mapping configured to correlate locations of the mobile device in the region based on the pixel grid coordinates at the respective locations.

Alternatively or in addition to the above described system, any one or combination of: the radio system includes one or more ultra-wide band radios to transmit the set of radio signals from which the current location of the mobile device in the region is determined. An additional radio system that includes one or more Bluetooth™ radios or one or more Wi-Fi radios to transmit another set of radio signals from which a RSSI value from each of the radio signals in the other set of radio signals is determined. The mobile device is configured to store the location mapping on a computing device communicatively accessible by a different mobile device that enters the region to access the location mapping and receive an indication of a device location in the region. The mobile device is configured to: determine that the mobile device has moved to a next location from the current location based on sensor data from inertial measurement sensors; determine the next location of the mobile device based on the location data received in the set of radio signals at the next location of the mobile device; determine next region coordinates at the next location of the mobile device in the region; associate the next region coordinates at the next location of the mobile device in the region with the pixel grid coordinates determined from the digital image view as captured by the camera system; and update the location mapping of the region based on the next location of the mobile device in the region.

The invention claimed is:

1. An indoor location system, comprising:
   a radio system of a region to transmit a set of radio signals that include location data;
   a camera system to capture a digital image view of the region to correlate a mobile device with pixel grid coordinates in the region;
   the mobile device configured to:
     determine a current location of the mobile device in the region based on the location data received in the set of radio signals at the current location of the mobile device;
     determine region coordinates at the current location of the mobile device in the region, the region coordinates being associated with the pixel grid coordinates determined from the digital image view as captured by the camera system in the region;
     generate a location mapping of the region based on the location data and the region coordinates associated with the pixel grid coordinates of the digital image views captured by the camera system at the current location and subsequent locations of the mobile device in the region; and
     access the location mapping after the radio system is removed from the region, the mobile device configured for location determination based on a current digital image view of the region correlated with mapped locations of the region as indicated in the location mapping.

2. The indoor location system as recited in claim 1, wherein the radio system of the region includes one or more ultra-wide band radios that transmit the set of radio signals from which the current location of the mobile device in the region is determined for the location mapping.

3. The indoor location system as recited in claim 1, further comprising an additional radio system that includes one or more Bluetooth™ radios or one or more Wi-Fi radios to transmit another set of radio signals from which a RSSI value from each of the radio signals in the other set of radio signals is determined.

4. The indoor location system as recited in claim 1, wherein the mobile device is configured to store the location mapping in a data store that is communicatively accessible by the mobile device that enters the region, accesses the location mapping, and determines its own device location in the region.

5. The indoor location system as recited in claim 1, wherein the mobile device is configured to:
   determine that the mobile device has moved to a next location from the current location based on device sensor data;
   determine the next location of the mobile device based on the location data received in the set of radio signals at the next location of the mobile device;
   determine next region coordinates at the next location of the mobile device in the region;
   associate the next region coordinates at the next location of the mobile device in the region with the pixel grid coordinates determined from an updated digital image view as captured by the camera system; and update the location mapping of the region based on the location data and the region coordinates associated with the pixel grid coordinates of a digital image view captured by the camera system at the next location of the mobile device in the region.

6. The indoor location system as recited in claim 1, wherein the mobile device is configured to store the location mapping in a data store on a computing device that is communicatively accessible by the mobile device that re-enters the region, accesses the location mapping, and determines its own device location of the mobile device in the region.

7. The indoor location system as recited in claim 1, wherein the radio system is removed from the system subsequent to the locations within the region being correlated with the pixel grid coordinates at the respective locations.

8. The indoor location system as recited in claim 1, wherein each of the locations in the region corresponds to a predetermined area of a particular size in the region, and the location mapping is generated based on the predetermined areas of the region.

9. A mobile device, comprising:
a radio of the mobile device to receive a set of radio signals from a radio system of a region that is indoors and transmits location data to the mobile device;
a data interface to receive digital image views of the region captured with a camera system and from which locations of the mobile device can be correlated with pixel grid coordinates in the region;
a location module implemented at least partially in hardware to:
determine a current location of the mobile device in the region based on the location data received in the set of radio signals at the current location of the mobile device;
determine region coordinates at the current location of the mobile device in the region, the region coordinates being associated with the pixel grid coordinates determined from a digital image view as captured by the camera system in the region;
generate a location mapping of the region based on the location data and the region coordinates associated with the pixel grid coordinates of the digital image views captured by the camera system at the current location and subsequent locations of the mobile device in the region; and
access the location mapping after the radio system is removed from the region, the location module of the mobile device configured for location determination based on a current digital image view of the region correlated with mapped locations of the region as indicated in the location mapping.

10. The mobile device as recited in claim 9, wherein the radio system includes one or more ultra-wide band radios that transmit the set of radio signals from which the current location of the mobile device in the region is determined for the location mapping.

11. The mobile device as recited in claim 9, wherein the location module is implemented to store the location mapping in a data store on a computing device that is communicatively accessible by the mobile device that re-enters the region, accesses the location mapping, and determines its own device location of the mobile device in the region.

12. The mobile device as recited in claim 11, wherein the location module is implemented to receive an indication of the mobile device location in the region from the computing device based on the pixel grid coordinates communicated to the computing device.

13. The mobile device as recited in claim 12, wherein the region coordinates are communicated to the computing device subsequent to the locations within the region being correlated with the pixel grid coordinates at the respective locations.

14. The mobile device as recited in claim 9, wherein the location module is implemented to:
determine that the mobile device has moved to a next location from the current location based on device sensor data;
determine the next location of the mobile device based on the location data received in the set of radio signals at the next location of the mobile device;
determine next region coordinates at the next location of the mobile device in the region;
associate the next region coordinates at the next location of the mobile device in the region with the pixel grid coordinates determined from an updated digital image view as captured by the camera system; and
update the location mapping of the region based on the location data and the region coordinates associated with the pixel grid coordinates of a digital image view captured by the camera system at the next location of the mobile device in the region.

15. A method, comprising:
determining a current location of a mobile device based on location data received in a set of radio signals at the current location of the mobile device in a region that is indoors, the set of radio signals received from a radio system of the region;
determining region coordinates at the current location of the mobile device in the region the region coordinates being associated with pixel grid coordinates determined from a digital image view as captured by a camera system in the region;
generating a location mapping of the region based on the location data and the region coordinates associated with the pixel grid coordinates of digital image views captured by the camera system at the current location and subsequent locations of the mobile device in the region; and
accessing the location mapping after the radio system is removed from the region, the mobile device configured for location determination based on a current digital image view of the region correlated with mapped locations of the region as indicated in the location mapping.

16. The method as recited in claim 15, further comprising:
storing the location mapping in a data store on a computing device that is communicatively accessible by the mobile device that enters the region, accesses the location mapping, and determines its own device location in the region.

17. The method as recited in claim 16, further comprising:
receiving an indication of the mobile device location in the region from the computing device based on the pixel grid coordinates communicated to the computing device.

18. The method as recited in claim 17, wherein the region coordinates are communicated to the computing device subsequent to the locations within the region being correlated with the pixel grid coordinates at the respective locations.

19. The method as recited in claim 15, wherein the radio system of the region includes one or more ultra-wide band radios that transmit the set of radio signals from which the current location of the mobile device in the region is determined.

20. The method as recited in claim 15, further comprising:
   determining that the mobile device has moved to a next location from the current location based on device sensor data;
   determining the next location of the mobile device based on the location data received in the set of radio signals at the next location of the mobile device;
   determining next region coordinates at the next location of the mobile device in the region;
   associating the next region coordinates at the next location of the mobile device in the region with the pixel grid coordinates determined from an updated digital image view as captured by the camera system; and
   updating the location mapping of the region based on the location data and the region coordinates associated with the pixel grid coordinates of a digital image view captured by the camera system at the next location of the mobile device in the region.

* * * * *